United States Patent [19]

Hadrami

[11] Patent Number: 5,655,309
[45] Date of Patent: Aug. 12, 1997

[54] TOOL FOR DETERMINING TRUE VERTICAL FOR TUBULAR OBJECTS

[76] Inventor: Ibrahim Al Hadrami, P.O. Box 30028, SA344 Yanbu Al-Sinaiyah, Saudi Arabia

[21] Appl. No.: 504,288

[22] Filed: Jul. 19, 1995

[51] Int. Cl.$^6$ .................................................. G01C 9/28
[52] U.S. Cl. ........................ 33/390; 33/371; 33/376
[58] Field of Search .................... 33/390, 333, 347, 33/365, 370, 371, 372, 373, 376, 389, 529

[56] References Cited

U.S. PATENT DOCUMENTS

| | | | |
|---|---|---|---|
| 2,432,124 | 12/1947 | Raines et al. | 33/390 |
| 3,826,013 | 7/1974 | Baher | 33/373 |
| 4,164,817 | 8/1979 | Walker | 33/371 |
| 4,908,949 | 3/1990 | Jaccard | 33/390 |
| 4,947,556 | 8/1990 | Peil | 33/370 |
| 5,174,572 | 12/1992 | Ho | 33/390 |
| 5,253,425 | 10/1993 | Wozniak | 33/373 |
| 5,255,443 | 10/1993 | Schmidt | 33/390 |
| 5,421,094 | 6/1995 | McCord et al. | 33/371 |
| 5,456,014 | 10/1995 | Wilson | 33/390 |
| 5,459,934 | 10/1995 | Heroux | 33/371 |

FOREIGN PATENT DOCUMENTS

| | | | |
|---|---|---|---|
| 1192535 | 5/1970 | United Kingdom | 33/371 |

*Primary Examiner*—Christopher W. Fulton
*Attorney, Agent, or Firm*—Harold E. Meier

[57] ABSTRACT

A construction tool for orienting the longitudinal axis of a tubular work piece perpendicular to the horizon (i.e. in a true vertical position) is disclosed. The tool comprises a concentric stack of tool sections increasing in external cross section area, similar in appearance to an upside down layered cake. The external cross section configuration of each succeeding plate is dimensioned to conform substantially with an interior cross section of various hollow tubular work pieces. Located at the center point the top tool section is a conventional bulls eye level. A trough is located in the sidewall of the tool parallel to a longitudinal axis of the tool. The cross section of the trough is dimensioned to conform substantially with the exterior of a hollow or solid tubular work piece.

7 Claims, 1 Drawing Sheet

TOOL FOR DETERMINING TRUE VERTICAL FOR TUBULAR OBJECTS

TECHNICAL FIELD OF THE INVENTION

This invention relates generally to construction tools and in particular to a tool for orienting the longitudinal axis of a tubular object perpendicular to the horizon.

BACKGROUND OF THE INVENTION

Construction projects often require a method for determining whether the longitudinal axis of a tubular object, such as a pipe, column, post, etc., is perpendicular to the horizon, i.e. in a true vertical position. The conventional method for determining true vertical is by using a plumb line and plumb bob. A plumb line is held adjacent to the face of the tubular object to be placed in a vertical position ("tubular work piece") and a plumb bob secured to the end of the plumb line is dropped toward the ground. When the plumb line reaches a static condition, the force of gravity will bring the plumb line in a true vertical position. However, if the plumb bob has contacted the ground or the plumb line is not taut or has come in contact with any projections from the tubular work piece, the plumb line will not be in a true vertical position. Additionally, if the wind is blowing against the plumb line or the tubular work piece is not stationary, attempting to get the plumb line to stabilize can be a difficult and time consuming process. Furthermore, once the plumb line is stabilized in a true vertical condition, the face of the tubular work piece must be aligned parallel to the plumb line.

SUMMARY OF THE INVENTION

The present invention (hereinafter called a "balancer") is a fast and efficient tool for orienting the longitudinal axis of a tubular work piece perpendicular to the horizon. The tubular work piece may be a hollow cylinder, such as a pipe or structural tube, or may be a solid tubular work piece such as a rod, column or, post. The tubular work piece need not be of cylindrical cross section, as the invention may be used alternatively in the same manner as a traditional carpenter's level.

The invention comprises at least one plate having a predetermined external cross sectional configuration dimensioned to conform substantially with the internal cross section of the tubular work piece. The balancer may incorporate additional plates with the external cross section configuration increasing in size in predetermined increments and stacked concentrically one on top of another in the reverse order of a traditional layered birthday cake, such a configuration thereby creating a central longitudinal axis. A conventional bulls eye level is located on the top center point of the top plate, which also corresponds to the longitudinal axis of the invention.

The balancer incorporates a trough cut out from or formed into a side of the balancer which is parallel to the longitudinal axis.

The invention is used by inserting the balancer into the upper open end of a hollow tubular work piece. The external cross sectional configuration of the balancer mates to the internal cross sectional configuration of the hollow tubular work piece. The longitudinal axis of the balancer thereby corresponds to the longitudinal axis of the hollow tubular work piece. The position of the work piece is manipulated until the bubble in the bulls eye level is in the center of the bulls eye.

Alteratively a solid tubular work piece may be oriented vertically by positioning the longitudinal trough located in the side of the balancer adjacent to an exterior surface of the work piece that is parallel to the longitudinal axis of the work piece. The position of the work piece is manipulated until the bubble in the bulls eye level is in the center of the bulls eye.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
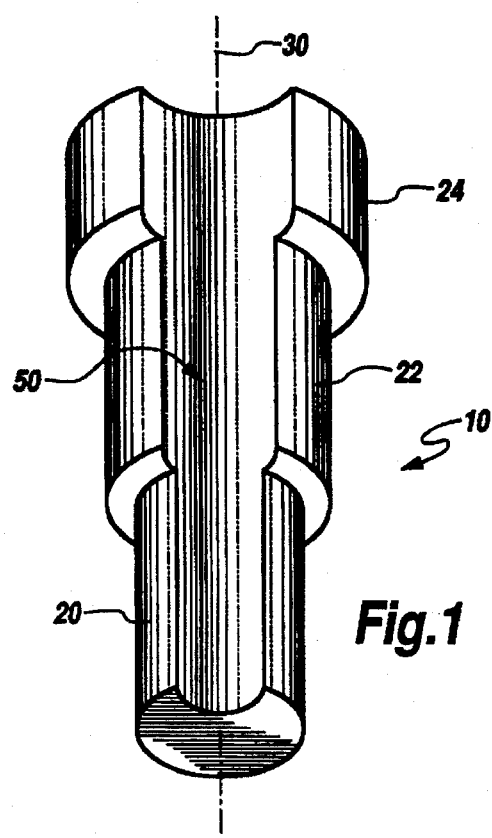
FIG. 1 is a perspective view of a tool for determining true vertical for a tubular work piece.
Figure 2:
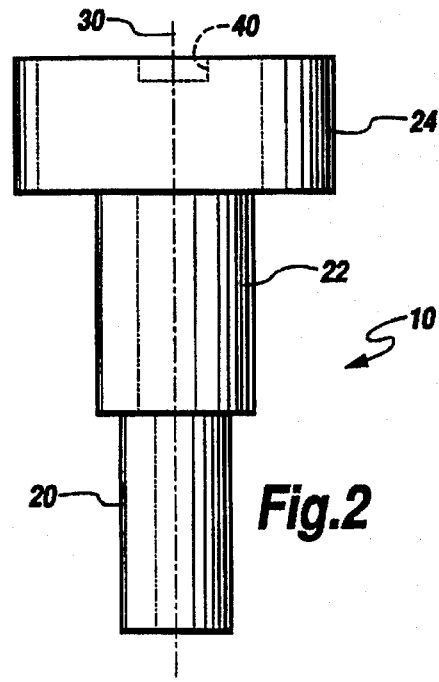
FIG. 2 is side view of the tool of FIG. 1 for determining true vertical for a tubular work piece.
Figure 3:
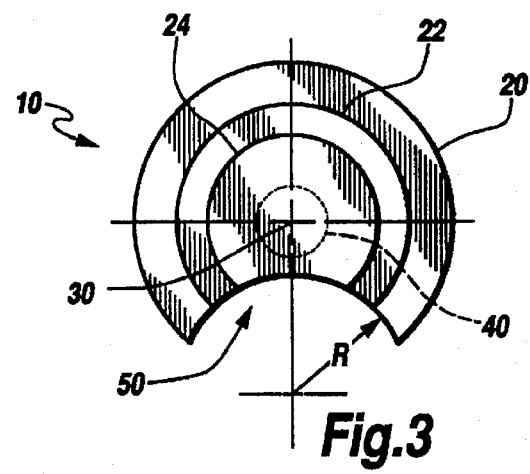
FIG. 3 is a bottom view of the tool of FIG. 1 for determining true vertical for a tubular work piece.

Referring now to FIGS. 1 through 3, there is illustrated a preferred embodiment of a tool (hereinafter referred to as a "balancer") 10 for orienting the longitudinal axis of a tubular work piece (not shown) perpendicular to the horizon, i.e. in a true vertical position. It will be understood that the balancer 10 and tubular work piece may have numerous cross sectional configurations. In the first embodiment, the tubular work piece and corresponding balancer 10 have a generally circular cross section. The balancer 10 will function with tubular work pieces that are hollow cylinders such as pipe or with solid tubular work pieces such as rode, columns or posts.

The balancer 10 comprises at least one section 20 having a predetermined cross sectional configuration which is dimensioned to conform substantially with the interior cross section of a hollow tubular work piece. As illustrated, the section 20 has a generally circular cross section. The balancer 10 may incorporate additional sections 22 and 24 having external cross sectional configuration of increasing size in predetermined graduated increments. The sections 20, 22 and 24 are positioned concentrically with respect to one another in the reverse order of a traditional layered cake, thereby creating a central longitudinal axis 30 in balancer 10. A conventional bulls eye level 40, is located in the center of the section 24, said location corresponding to the central longitudinal axis 30 of the balancer 10.

The balancer 10 also incorporates a trough 50 formed into the side of the balancer, parallel to the central longitudinal axis 30. The trough 50 has a predetermined interior cross section dimensioned to substantially mate with the exterior cross section of a work piece. In the preferred embodiment, the interior cross section of trough 50 is generally circular with radius R.

Figure 4:
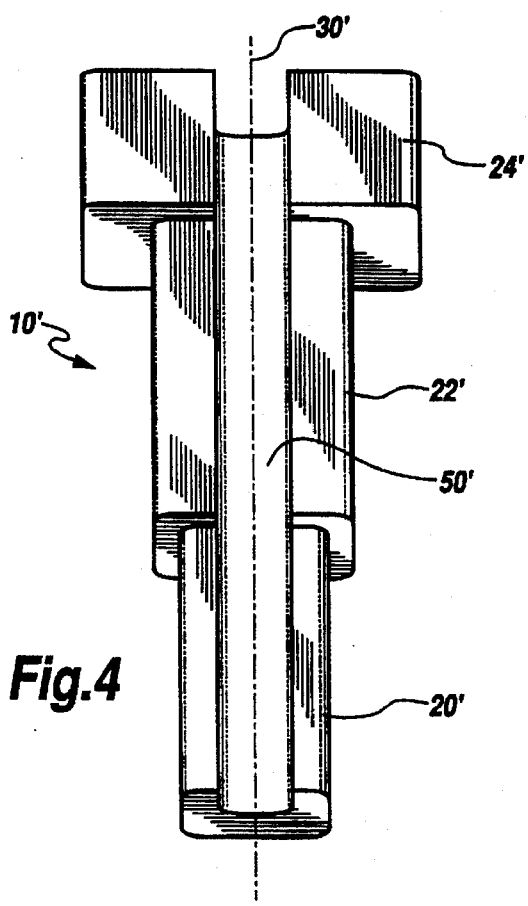
FIG. 4 is a perspective view of an alternative embodiment of a tool for determining true vertical for a tubular work piece of a non-circular cross section.
Figure 5:
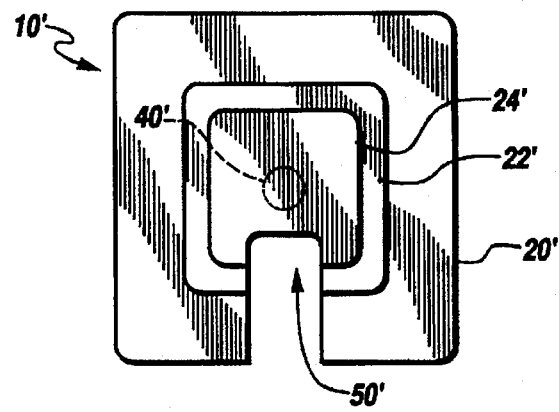
FIG. 5 is a bottom view of an alternative embodiment of a tool for determining true vertical for a tubular work piece of a non-circular cross section.

Referring now to FIGS. 4 and 5, wherein an alternate embodiment is illustrated, reference characters corresponding to like or similar parts included in the first embodiment include a "'" in the alternate embodiment. The balancer 10' is constructed for use with a conventional square tubular work piece such as a square hollow tubular member commonly used for structural columns. Section 20' has a predetermined cross sectional configuration and is dimensioned to conform substantially with the hollow interior cross section of the square tubular work piece. The sections 20', 22' and 24' are concentrically positioned with respect to each other in graduated incremental sizes thereby creating a central longitudinal axis 30' in balancer 10'. A conventional bulls eye level 40' is located in the center of the section 24,' said location corresponding to the central longitudinal axis 30' of the balancer 10'.

The balancer 10' also incorporates a trough 50' formed into the side of the balancer parallel to the central longitudinal axis 30'. The trough 50' has a predetermined interior cross section dimensioned to conform substantially with the exterior of the tubular work piece.

The balancer 10' is used by inserting into the upper open end of a hollow tubular work piece. The external cross sectional configuration of the balancer 10' mates to the internal cross section of the hollow tubular work piece (not shown). The longitudinal axis 30' of the balancer thereby corresponds to the longitudinal axis of the hollow tubular work piece. The work piece is manipulated until the bubble in the bulls eye level 40' is in the center of the bulls eye, at which time the longitudinal axis of the tubular work piece will be in a vertical position.

Alternatively a solid tubular work piece may be oriented vertically by positioning the trough 50' located in the side of balancer 10' adjacent to an exterior surface of the work piece that is parallel to the longitudinal axis of the work piece. The position of the work piece is manipulated until the bubble in the bulls eye level 40' is in the center of the bulls eye, at which time the longitudinal axis of the tubular work piece will be in a vertical position.

Although a preferred embodiment and alternative embodiment of the invention have been illustrated in the accompanying Drawings and described in the foregoing Detailed Description, it will be understood that the invention is not limited to the embodiments disclosed but is capable of numerous modifications without departing from the scope of the invention as claimed.

I claim:

1. A tool for orienting the longitudinal axis of a work piece, in a true vertical position comprising:

a first tool section having a sidewall with a predetermined exterior cross section dimensioned to conform substantially with an interior cross section of the work piece, said section having a center point and a central longitudinal axis, said center point location corresponding to the central longitudinal axis;

a bulls eye level mounted in a fixed location at the center point, said bulls eye level indicating a true vertical position of the longitudinal axis of the hollow tool work piece; and a trough located in the sidewall and oriented parallel to the central longitudinal axis, said trough having a predetermined cross section dimensioned to partially encircle an exterior cross section of the work piece.

2. The tool of claim 1 further comprising a second tool section of smaller cross sectional area positioned concentrically with respect to said first tool section.

3. The tool of claim 2 further comprising additional tool sections of decreasing cross sectional area positioned concentrically with respect to said first tool section.

4. The tool of claim 1 wherein said first tool section has a generally circular cross section.

5. The tool of claim 1 wherein said first tool section has a square cross section with rounded corners.

6. The tool of claim 1 wherein the trough has a generally circular cross section.

7. The tool of claim 1 wherein the trough has a square cross section with rounded corners.

* * * * *